(12) United States Patent
Oshima et al.

(10) Patent No.: US 10,848,013 B2
(45) Date of Patent: Nov. 24, 2020

(54) WIRELESS POWER RECEPTION DEVICE AND WIRELESS POWER TRANSMISSION SYSTEM

(71) Applicant: TDK CORPORATION, Tokyo (JP)

(72) Inventors: Kazunori Oshima, Tokyo (JP); Ryo Miyazawa, Tokyo (JP); Shinya Ofuji, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 16/365,236

(22) Filed: Mar. 26, 2019

(65) Prior Publication Data

US 2019/0305613 A1    Oct. 3, 2019

(30) Foreign Application Priority Data

Mar. 30, 2018    (JP) .................................. 2018-070110

(51) Int. Cl.
| | |
|---|---|
| *H02J 50/12* | (2016.01) |
| *H02J 50/90* | (2016.01) |
| *B60L 53/62* | (2019.01) |
| *B60L 53/12* | (2019.01) |
| *H02J 7/02* | (2016.01) |

(52) U.S. Cl.
CPC .............. *H02J 50/90* (2016.02); *H02J 50/12* (2016.02); *B60L 53/12* (2019.02); *B60L 53/62* (2019.02); *H02J 7/025* (2013.01)

(58) Field of Classification Search
CPC . B60L 53/12; B60L 53/62; H02J 7/025; H02J 50/10; H02J 50/12; H02J 50/90

USPC ........................................................ 307/104
See application file for complete search history.

(56) References Cited

U.S. PATENT DOCUMENTS

| | | | |
|---|---|---|---|
| 2016/0114687 A1* | 4/2016 | Ichikawa | ................ H01F 38/14 701/22 |
| 2017/0346346 A1* | 11/2017 | Shimokawa | ............ H03L 7/085 |

FOREIGN PATENT DOCUMENTS

| | | |
|---|---|---|
| CA | 3 024 826 A1 | 11/2017 |
| WO | 2017/199374 A1 | 11/2017 |

\* cited by examiner

*Primary Examiner* — William Hernandez
(74) *Attorney, Agent, or Firm* — Oliff PLC

(57) ABSTRACT

A wireless power reception device includes: a power receiving coil coupled to a transmitting coil; a first rectifier circuit rectifies AC voltage supplied from the receiving coil and outputs to a load; a first capacitor connected between 11th and 12th output terminals respectively on high and low potential sides among output terminals in the first rectifier circuit and the first rectifier circuit and the load; a second rectifier circuit connected to the receiving coil parallel to the first and rectifies AC voltage supplied from the receiving coil; a second capacitor connected between 21st and 22nd output terminals respectively on the high and low potential sides among second rectifier circuit output terminals; a second voltage detecting circuit detects voltage between the 21st and 22nd output terminals; and a position detecting circuit detects the receiving coil position relative to the power transmitting coil by voltage detected by the second voltage detecting circuit.

20 Claims, 2 Drawing Sheets

WIRELESS POWER RECEPTION DEVICE AND WIRELESS POWER TRANSMISSION SYSTEM

BACKGROUND OF THE INVENTION

Field of the Invention

The present invention relates to a wireless power reception device and a wireless power transmission system.

Priority is claimed on Japanese Patent Application No. 2018-070110, filed Mar. 30, 2018, the content of which is incorporated herein by reference.

Description of Related Art

Technology associated with wireless power transmission which is transmission of electric power in a wireless manner has been studied and developed.

In this regard, a noncontact power supply system that detects a coil position on the basis of an AC voltage which is supplied in a stage previous to a rectification and smoothing circuit to the rectification and smoothing circuit when a relay circuit disposed between a battery is connected to the drive circuit and the drive circuit is turned on and detects a coil position on the basis of a DC voltage which is supplied in a stage subsequent to the rectification and smoothing circuit from the rectification and smoothing circuit when the relay circuit is turned off is known as a noncontact power supply system that supplies electric power from a ground-side power transmitting coil to a vehicle-side power receiving coil (see Patent Document 1). The noncontact power supply system includes the rectification and smoothing circuit that rectifies an AC voltage supplied from the power receiving coil and converts the voltage into a pulsating voltage and smooths the converted pulsating voltage into a DC voltage, and a drive circuit connected to the rectification and smoothing circuit.

PATENT DOCUMENTS

[Patent Document 1] International Patent Application Publication No. 2017/199374

SUMMARY OF THE INVENTION

Here, in such a noncontact power supply system, the rectification and smoothing circuit includes a rectifier circuit that rectifies the supplied AC voltage to a pulsating voltage, and a smoothing capacitor that smooths the pulsating voltage rectified by the rectifier circuit to a DC voltage. In this smoothing capacitor, the pulsating voltage cannot be smoothed with high accuracy when a magnitude of the DC voltage is greater, and a large ripple is generated. That is, in the noncontact power supply system, the DC voltage supplied from the rectification and smoothing circuit greatly fluctuates due to the ripple when the magnitude of the DC voltage is greater. As a result, the noncontact power supply system may be unable to accurately detect the coil position when the relay circuit is turned off, that is, when an electrical connection between the drive circuit and the battery connected to the drive circuit is disconnected.

The invention was made in consideration of the above-mentioned circumstances, and an objective thereof is to provide a wireless power reception device and a wireless power transmission system that can detect a position of a power receiving coil relative to a power transmitting coil irrespective of a connection state of a load.

According to an aspect of the invention, there is provided a wireless power reception device that receives AC power from a power transmitting coil of a wireless power transmission device, the wireless power reception device including: a power receiving coil that is magnetically coupled to the power transmitting coil; a first rectifier circuit that rectifies an AC voltage supplied from the power receiving coil and outputs the rectified voltage to a load; a first capacitor connected between an 11th output terminal on the high potential side among output terminals included in the first rectifier circuit and a 12th output terminal on the low potential side among the output terminals included in the first rectifier circuit between the first rectifier circuit and the load; a second rectifier circuit that is connected to the power receiving coil in parallel to the first rectifier circuit and rectifies the AC voltage supplied from the power receiving coil; a second capacitor connected between a 21st output terminal on the high potential side among output terminals included in the second rectifier circuit and a 22nd output terminal on the low potential side among the output terminals included in the second rectifier circuit; a second voltage detecting circuit that detects a voltage between the 21st output terminal and the 22nd output terminal; and a position detecting circuit that detects a position of the power receiving coil relative to the power transmitting coil on the basis of the voltage detected by the second voltage detecting circuit.

According to the aspect of the invention, it is possible to accurately detect a position of a power receiving coil relative to a power transmitting coil irrespective of a connection state of a load.

DETAILED DESCRIPTION OF THE INVENTION

Embodiments

Hereinafter, an embodiment of the invention will be described with reference to the accompanying drawings. In this embodiment, transmission of power in a wireless manner is referred to as wireless power transmission for the purpose of convenience of description. In this embodiment, a conductor that transmits an electrical signal based on DC power or an electrical signal based on AC power is referred to as a transmission line. A transmission line is, for example, a conductor which is printed on a board. A transmission line may be a wire which is a conductor formed in a line shape or the like instead of a conductor.

Overview of Wireless Power Transmission System

Figure 1:
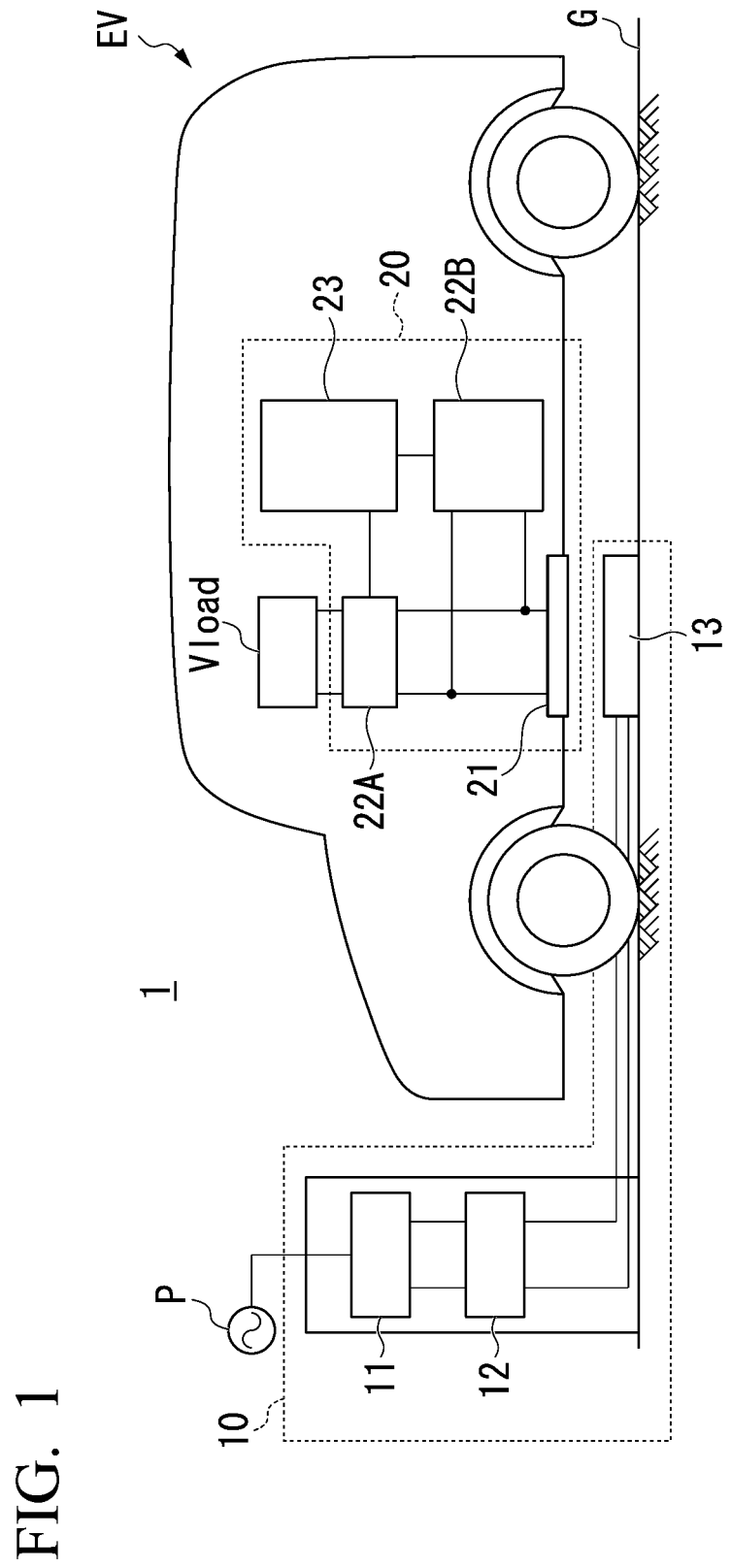
FIG. 1 is a diagram illustrating an example of a configuration of a wireless power transmission system 1 according to an embodiment.

First, the outline of a wireless power transmission system 1 according to the embodiment will be described below. FIG. 1 is a diagram illustrating an example of the configuration of the wireless power transmission system 1 according to the embodiment.

The wireless power transmission system 1 includes a wireless power transmission device 10 and a wireless power reception device 20.

In the wireless power transmission system 1, power is transmitted from the wireless power transmission device 10 to the wireless power reception device 20 by wireless power transmission. More specifically, in the wireless power transmission system 1, power is transmitted from a power transmitting coil L1 (not illustrated in FIG. 1) of the wireless power transmission device 10 to a power receiving coil L2 (not illustrated in FIG. 1) of the wireless power reception device 20 by wireless power transmission. The wireless power transmission system 1 performs wireless power transmission, for example, using a magnetic field resonance system. The wireless power transmission system 1 may be configured to perform wireless power transmission using another system instead of the magnetic field resonance system.

In the following description, it is assumed that the wireless power transmission system 1 is applied to a system that performs charging of a battery (a secondary battery) mounted in an electric vehicle EV using wireless power transmission as illustrated in FIG. 1. An electric vehicle EV is a motor-driven vehicle (a moving object) that travels by driving a motor using power charged in the battery. In the example illustrated in FIG. 1, the wireless power transmission system 1 includes the wireless power transmission device 10 which is installed on a ground surface G on a charging facility side and the wireless power reception device 20 which is mounted in an electric vehicle EV. The wireless power transmission system 1 may be configured to be applied to another device, another system, or the like instead of the configuration in which it is applied to the above-mentioned system.

In wireless power transmission using a magnetic field resonance system, the wireless power transmission system 1 causes resonance frequencies of a transmission-side resonance circuit (which is included in a power transmitting coil unit 13 which will be described later in the example illustrated in FIG. 1, and is not illustrated in FIG. 1) which is included in the wireless power transmission device 10 and a reception-side resonance circuit (which is included in a power receiving coil unit 21 which will be described later in the example illustrated in FIG. 1, and is not illustrated in FIG. 1) which is included in the wireless power reception device 20 to approach each other (or causes the resonance frequencies to match each other), applies high-frequency current and voltage in the vicinity of the resonance frequency to a power transmitting coil unit 13, and wirelessly transmits (supplies) power to a power receiving coil unit 21 which is electromagnetically resonated.

Accordingly, the wireless power transmission system 1 according to this embodiment can transmit power supplied from a charging facility side to an electric vehicle EV in a wireless manner and charge a battery mounted in the electric vehicle EV using wireless power transmission without connection using a charging cable.

However, it is known that, when a position of the wireless power reception device 20 relative to the wireless power transmission device 10 deviates from a predetermined position, that is, when a position of a power receiving coil L2 relative to a power transmitting coil L1 deviates from a predetermined position, a transmission efficiency of wireless power transmission from the power transmitting coil unit 13 to the power receiving coil unit 21 decreases. A transmission efficiency is represented, for example, by an amount of power transmitted per unit time by wireless power transmission. Instead, a transmission efficiency may be represented by another amount based on wireless power transmission.

In the wireless power transmission system 1, in order to curb a decrease in transmission efficiency of such wireless power transmission, the wireless power reception device 20 detects a position of the wireless power reception device 20 relative to the wireless power transmission device 10, that is, a position of the power receiving coil L2 relative to the power transmitting coil L1.

Specifically, in the wireless power transmission system 1, when information indicating that detection of the position of the power receiving coil L2 relative to the power transmitting coil L1 is started is acquired from the wireless power reception device 20, the wireless power transmission device 10 starts transmission of weak power from the power transmitting coil L1 to the power receiving coil L2. For example, the wireless power transmission device 10 acquires the information from the wireless power reception device 20 by wireless communication based on a standard such as Wi-Fi (registered trademark).

Here, weak power is power which is required for the wireless power reception device 20 to detect a position of the power receiving coil L2 relative to the power transmitting coil L1. Weak power is power which is lower (weaker) than normal power. Normal power is power which is transmitted from the wireless power transmission device 10 to the wireless power reception device 20 by wireless power transmission when a battery (a secondary battery) mounted in an electric vehicle EV is charged by wireless power transmission. For example, weak power is power corresponding to about 1% to 10% of normal power. Weak power may be power which is less than 1% of normal power or may be power which is greater than 10% of normal power. The wireless power transmission device 10 may be configured to start transmission of weak power to the wireless power reception device 20 using another method.

When weak power is received, the wireless power reception device 20 detects a position of the power receiving coil L2 relative to the power transmitting coil L1 on the basis of the received weak power. The wireless power reception device 20 performs an operation based on the detected position. For example, the wireless power reception device 20 waits until the position matches a predetermined position. When it is determined that the position matches the predetermined position, the wireless power reception device 20 outputs information indicating that the position matches the predetermined position to the wireless power transmission device 10 by the wireless communication. When the information is acquired, the wireless power transmission device 10 transmits normal power to the wireless power reception device 20 by wireless power transmission.

Configuration of Wireless Power Transmission System

The configuration of the wireless power transmission system 1 will be described below with reference to FIG. 1.

The wireless power transmission device 10 includes a conversion circuit 11, a power transmitting circuit 12, and a power transmitting coil unit 13. On the other hand, the wireless power reception device 20 includes a power receiving coil unit 21, a first circuit 22A, a second circuit 22B, and a control circuit 23. The wireless power reception device 20 can be connected to a load Vload. In the example illustrated in FIG. 1, the wireless power reception device 20 is connected to the load Vload. The wireless power reception device 20 may include the load Vload.

The conversion circuit 11 is, for example, an alternating current/direct current (AC/DC) converter that is connected to an external commercial power supply P and converts an AC voltage input from the commercial power supply P into a desired DC voltage. The conversion circuit 11 is connected to the power transmitting circuit 12. The conversion circuit 11 supplies the DC voltage into which the AC voltage is converted to the power transmitting circuit 12.

The conversion circuit 11 is not particularly limited as long as it can output a DC voltage to the power transmitting circuit 12. For example, the conversion circuit 11 may be a conversion circuit in which a rectification and smoothing circuit that rectifies an AC voltage and converts the AC voltage into a DC voltage and a power factor correction (PFC) circuit that performs power factor correction are combined, may be a conversion circuit in which the rectification and smoothing circuit and a switching circuit such as a switching converter are combined, or may be another conversion circuit that outputs a DC voltage to the power transmitting circuit 12.

The power transmitting circuit 12 serves to convert a DC voltage supplied from the conversion circuit 11 into an AC voltage. For example, the power transmitting circuit 12 includes a switching circuit in which a plurality of switching elements are bridge-connected. The power transmitting circuit 12 is connected to the power transmitting coil unit 13. The power transmitting circuit 12 supplies an AC voltage, a drive frequency of which has been controlled on the basis of a resonance frequency of a transmission-side resonance circuit included in the power transmitting coil unit 13, to the power transmitting coil unit 13.

The power transmitting coil unit 13 includes, for example, an LC resonance circuit including a capacitor which is not illustrated in FIG. 1 along with the power transmitting coil L1 which is not illustrated in FIG. 1 as a transmission-side resonance circuit. In this case, the power transmitting coil unit 13 can adjust the resonance frequency of the transmission-side resonance circuit by adjusting a capacitance of the capacitor. The wireless power transmission device 10 causes the resonance frequency of the transmission-side resonance circuit to approach (or match) a resonance frequency of a reception-side resonance circuit of the power receiving coil unit 21 and performs wireless power transmission using a magnetic field resonance system. The capacitor may be constituted, for example, by a capacitor connected in series to the power transmitting coil L1, may be constituted by a capacitor connected in series to the power transmitting coil L1 and a capacitor connected in parallel to the power transmitting coil L1, or may be constituted in another configuration. In the following description, it is assumed that the capacitor is a capacitor connected in series to the power transmitting coil L1. The power transmitting coil unit 13 may include another resonance circuit including the power transmitting coil L1 as the transmission-side resonance circuit instead of the LC resonance circuit. The power transmitting coil unit 13 may include another circuit or another circuit element in addition to the transmission-side resonance circuit. The power transmitting coil unit 13 may include a magnetic material that enhances magnetic coupling between the power transmitting coil L1 and the power receiving coil L2 or an electromagnetic shield that curbs leakage of a magnetic field generated by the power transmitting coil L1 to the outside.

The power transmitting coil L1 is, for example, a coil for wireless power transmission which is obtained by winding a litz wire formed of copper or aluminum in a spiral shape. The power transmitting coil L1 in this embodiment is installed on the ground surface G or is buried in the ground surface G such that it faces the bottom of the floor of the electric vehicle EV. In the following description, for example, it is assumed that the power transmitting coil L1 (that is, the power transmitting coil unit 13) is installed on the ground surface G along with the power transmitting circuit 12.

The power receiving coil unit 21 includes, for example, an LC resonance circuit including a capacitor which is not illustrated in FIG. 1 along with the power receiving coil L2 which is not illustrated in FIG. 1 as the reception-side resonance circuit. In this case, the power receiving coil unit 21 can adjust the resonance frequency of the reception-side resonance circuit by adjusting a capacitance of the capacitor. The wireless power reception device 20 performs wireless power transmission using a magnetic field resonance system by causing the resonance frequency of the reception-side resonance circuit to approach (or match) the resonance frequency of the transmission-side resonance circuit. The capacitor may be constituted, for example, by a capacitor connected in series to the power receiving coil L2, may be constituted by a capacitor connected in series to the power receiving coil L2 and a capacitor connected in parallel to the power receiving coil L2, or may be constituted in another configuration. In the following description, it is assumed that the capacitor is a capacitor connected in series to the power receiving coil L2. The power receiving coil unit 21 may include another resonance circuit including the power receiving coil L2 as the reception-side resonance circuit instead of the LC resonance circuit. The power receiving coil unit 21 may include another circuit or another circuit element in addition to the reception-side resonance circuit. The power receiving coil unit 21 may include a magnetic material that enhances magnetic coupling between the power transmitting coil L1 and the power receiving coil L2 or an electromagnetic shield that curbs leakage of a magnetic field generated by the power receiving coil L2 to the outside.

The first circuit 22A is connected to the power receiving coil unit 21 and serves to rectify an AC voltage supplied from the power receiving coil L2 and to convert the AC voltage into a DC voltage. The first circuit 22A can be connected to a load Vload. In the example illustrated in FIG. 1, the first circuit 22A is connected to the load Vload. When the first circuit 22A is connected to the load Vload, the first circuit 22A supplies the converted DC voltage to the load Vload. In the wireless power reception device 20, the first circuit 22A may be connected to the load Vload via a charging circuit when it is connected to the load Vload.

When the load Vload is connected to the first circuit 22A, the load Vload is supplied with a DC voltage from the first circuit 22A. For example, the load Vload is a battery mounted in the electric vehicle EV or a motor mounted in the electric vehicle EV. The load Vload is a resistive load of which an equivalent resistance value varies over time depending on demand conditions (storage conditions or consumption conditions) of power. In the wireless power reception device 20, the load Vload may be another load which is supplied with a DC voltage from the first circuit 22A instead of the battery or the motor.

The second circuit 22B is connected to the power receiving coil unit 21 in parallel to the first circuit 22A. The second circuit 22B rectifies an AC voltage supplied from the power receiving coil L2 and converts the voltage into a DC voltage.

The second circuit 22B detects the converted DC voltage. The second circuit 22 B outputs the detected DC voltage to the control circuit 23.

The control circuit 23 controls the wireless power reception device 20. For example, the control circuit 23 transmits and receives a variety of information to and from the wireless power transmission device 10.

Further, when the power receiving coil L2 receives the weak power described above, the control circuit 23 acquires the DC voltage detected by the second circuit 22B from the second circuit 22B. The control circuit 23 detects a position of the power receiving coil L2 relative to the power transmitting coil L1 on the basis of the acquired DC voltage. The control circuit 23 determines whether the position indicated by the detected position has matched a predetermined position. When it is determined that the position of the power receiving coil L2 relative to the power transmitting coil L1 has matched the predetermined position, the control circuit 23 outputs information indicating that the position of the power receiving coil L2 relative to the power transmitting coil L1 has matched the predetermined position to the wireless power transmission device 10 by wireless communication. Here, when the position of the power receiving coil L2 relative to the power transmitting coil L1 is included in a predetermined range, the control circuit 23 determines that the position of the power receiving coil L2 relative to the power transmitting coil L1 has matched the predetermined position. The control circuit 23 may be configured to determine that the position of the power receiving coil L2 relative to the power transmitting coil L1 has matched the predetermined position using another method. Some or all of the functions of the control circuit 23 may be provided in an electronic control circuit (ECU) of the electric vehicle EV.

Configuration of Wireless Power Reception Device

Figure 2:
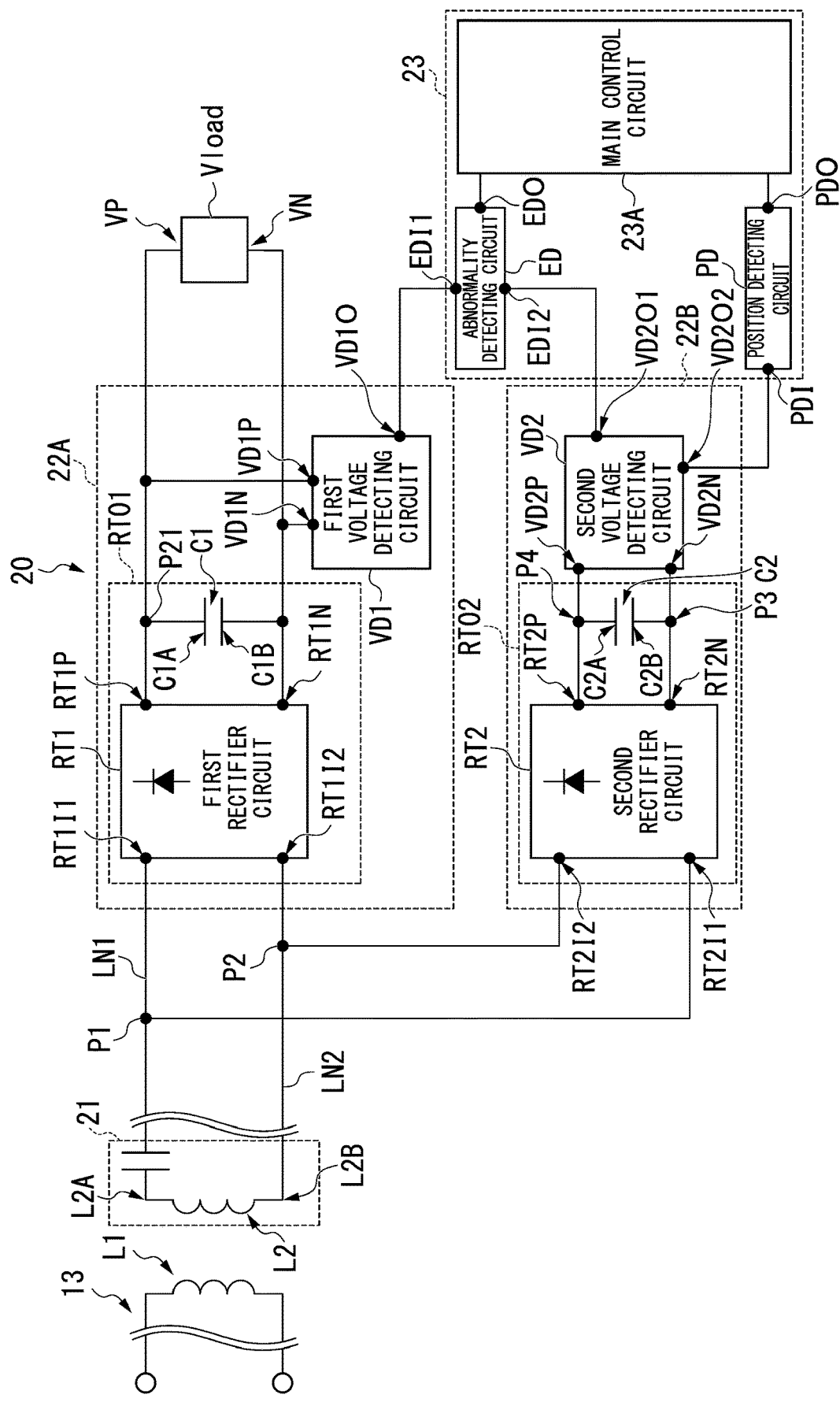
FIG. 2 is a diagram illustrating an example of a configuration of a wireless power reception device 20.

The configuration of the wireless power reception device 20 will be described below with reference to FIG. 2. FIG. 2 is a diagram illustrating an example of the configuration of the wireless power reception device 20.

The wireless power reception device 20 includes the power receiving coil unit 21, the first circuit 22A, the second circuit 22B, and the control circuit 23 as described above.

The first circuit 22A includes, for example, a first rectification and smoothing circuit RT01 and a first voltage detecting circuit VD1. Further, the first rectification and smoothing circuit RT01 includes a first rectifier circuit RT1 and a capacitor C1. The first circuit 22A may include another circuit element in addition to the first rectification and smoothing circuit RT01 and the first voltage detecting circuit VD1.

The first rectifier circuit RT1 includes four terminals: an input terminal RT1I1, an input terminal RT1I2, an output terminal RT1P on the high potential side, and an output terminal RT1N on the low potential side. The output terminal RT1P is an example of an 11th output terminal. The output terminal RT1N is an example of a 12rd output terminal.

The capacitor C1 includes two terminals: a terminal C1A and a terminal C1B.

The first voltage detecting circuit VD1 includes three terminals: a terminal VD1P on the high potential side, a terminal VD1N on the low potential side, and a signal output terminal VD1O for signal output.

On the other hand, the second circuit 22B includes a second rectification and smoothing circuit RT02 and a second voltage detecting circuit VD2. Further, the second rectification and smoothing circuit RT02 includes a second rectifier circuit RT2 and a capacitor C2. The second circuit 22 B may include another circuit element in addition to the second rectification and smoothing circuit RT02 and the second voltage detecting circuit VD2.

The second rectifier circuit RT2 includes four terminals: an input terminal RT2I1, an input terminal RT2I2, an output terminal RT2P on the high potential side, and an output terminal RT2N on the low potential side. The output terminal RT2P is an example of a 21st output terminal. The output terminal RT2N is an example of a 22nd output terminal.

The capacitor C2 includes two terminals: a terminal C2A and a terminal C2B.

The second voltage detecting circuit VD2 includes four terminals: a terminal VD2P on the high potential side, a terminal VD2N on the low potential side, a signal output terminal VD2O1 for signal output, and a signal output terminal VD2O2 for signal output.

The above-mentioned power receiving coil L2 includes two terminals: a terminal L2A and a terminal L2B. The above-mentioned load Vload includes two terminals: a power supply terminal VP on the high potential side and a power supply terminal VN on the low potential side.

The control circuit 23 includes a position detecting circuit PD, an abnormality detecting circuit ED, and a main control circuit 23A.

The position detecting circuit PD includes two terminals: a signal input terminal PDI for signal input and a signal output terminal PDO for signal output.

Further, the abnormality detecting circuit ED includes two terminals: a signal input terminal EDI1 for signal input, a signal input terminal EDI2 for signal input, and a signal output terminal EDO for signal output.

Connection patterns between elements in the wireless power reception device 20 will be described below.

In the wireless power reception device 20, the terminal L2A of the power receiving coil L2 and the input terminal RT1I1 of the first rectifier circuit RT1 are connected to each other by a transmission line LN1. Here, in the example illustrated in FIG. 1, a capacitor of the power reception side resonance circuit included in the power receiving coil unit 21 is provided on the transmission line LN1 included in the power receiving coil unit 21. Further, in the wireless power reception device 20, the terminal L2B of the power receiving coil L2 and the input terminal RT1I2 of the first rectifier circuit RT1 are connected to each other by a transmission line LN2.

Further, in the wireless power reception device 20, the capacitor C1 and the first voltage detecting circuit VD1 are connected in parallel between the output terminal RT1P and the output terminal RT1N of the first rectifier circuit RT1 by a transmission line. More specifically, the terminal C1A of the capacitor C1 and the terminal VD of the first voltage detecting circuit VD1 are connected to the output terminal RT1P of the first rectifier circuit RT1 by a transmission line. The terminal C1B of the capacitor C1 and the terminal VD1N of the first voltage detecting circuit VD1 are connected to the output terminal RT1N of the first rectifier circuit RT1 by a transmission line.

Here, when the load Vload is connected to the wireless power reception device 20, the capacitor C1, the first voltage detecting circuit VD1, and the load Vload are connected in parallel between the output terminal RT1P and the output terminal RT1N of the first rectifier circuit RT1 by a transmission line. FIG. 2 illustrates an example of a configuration of the wireless power reception device 20 when the load Vload is connected. More specifically, in this case, the terminal C1A of the capacitor C1, the terminal VD1P of the first voltage detecting circuit VD1, and the power supply terminal VP of the load Vload are connected to the output terminal RT1P of the first rectifier circuit RT1 by the transmission line. Further, in this case, the terminal C1B of the capacitor C1, the terminal VD1N of the first voltage detecting circuit VD1, and the power supply terminal VN of the load Vload are connected to the output terminal RT1N of the first rectifier circuit RT1 by a transmission line. That is, the capacitor C1 is a smoothing capacitor that smoothes ripples of a pulsating voltage after rectification in the first rectifier circuit RT1.

Further, in the wireless power reception device 20, the signal output terminal VD1O of the first voltage detecting circuit VD1 and the signal input terminal EDI1 of the abnormality detecting circuit ED are connected by a transmission line.

Further, in the transmission line LN1 described above, a connection point P1 is provided between the terminal L2A of the power receiving coil L2 and the input terminal RT1I1 of the first rectifier circuit RT1 between the power receiving coil L2 and the first rectifier circuit RT1. In the transmission line LN2, a connection point P2 is provided between the terminal L2B of the power receiving coil L2 and the input terminal RT1I2 of the first rectifier circuit RT1 between the power receiving coil L2 and the first rectifier circuit RT1.

In the wireless power reception device 20, the input terminal RT2I1 of the second rectifier circuit RT2 is connected to the connection point P1 by a transmission line. In the wireless power reception device 20, the input terminal RT2I2 of the second rectifier circuit RT2 is connected to the connection point P2 by a transmission line.

In the wireless power reception device 20, the capacitor C2 and the second voltage detecting circuit VD2 are connected in parallel between the output terminal RT2P of the second rectifier circuit RT2 and the output terminal RT2N of the second rectifier circuit RT2 by a transmission line. More specifically, the terminal C2A of the capacitor C2 and the terminal VD2P of the second voltage detecting circuit VD2 are connected to the output terminal RT2P of the second rectifier circuit RT2 by a transmission line. The terminal C2B of the capacitor C2 and the terminal VD2N of the second voltage detecting circuit VD2 are connected to the output terminal RT2N of the second rectifier circuit RT2 by a transmission line. That is, the capacitor C2 is a smoothing capacitor that smooths ripples of the pulsating voltage after rectification in the second rectifier circuit RT2. Here, it is desirable for a capacitance of the capacitor C2 to be smaller than a capacitance of the capacitor C1. In the following description, for example, it is assumed that the capacitance of the capacitor C2 is smaller than the capacitance of the capacitor C1. Accordingly, the wireless power reception device 20 can increase a gain of the output voltage of the second voltage detecting circuit VD2 while suppressing the ripples output from the first rectifier circuit RT1. As a result, the wireless power reception device 20 can more accurately detect the position of the power receiving coil L2 relative to a power transmitting coil L1. The capacitance of the capacitor C2 may be the same as the capacitance of the capacitor C1.

Further, in the wireless power reception device 20, the signal output terminal VD2O1 of the second voltage detecting circuit VD2 and the signal input terminal EDI2 of the abnormality detecting circuit ED are connected by a transmission line.

Further, in the wireless power reception device 20, the signal output terminal VD2O2 of the second voltage detecting circuit VD2 and the signal input terminal PDT of the position detecting circuit PD are connected by a transmission line.

In the wireless power reception device 20, the signal output terminal EDO of the abnormality detecting circuit ED and the signal input terminal of the main control circuit 23A are connected by a transmission line.

In the wireless power reception device 20, the signal output terminal PDO of the position detecting circuit PD and the signal input terminal of the main control circuit 23A are connected by a transmission line.

Thus, elements included in the wireless power reception device 20 are connected. the elements included in the wireless power reception device 20 may be connected according to another connection aspect in which the function of the wireless power reception device 20 is not lost, instead of the connection patterns illustrated in FIG. 2.

Next, a configuration and operation of each element included in the wireless power reception device 20 will be described below.

The first rectifier circuit RT1 rectifies an AC voltage supplied from the power receiving coil L2 and converts the voltage into a pulsating voltage. For example, the first rectifier circuit RT1 may be a half-wave rectifier circuit including one switching element, a half-wave rectifier circuit including one diode, a full-wave rectifier circuit including four switching elements or four diodes which are bridge-connected, or another rectifier circuit that rectifies an AC voltage supplied from the power receiving coil L2 and converts the voltage into a pulsating voltage. The pulsating voltage rectified by the first rectifier circuit RT1 is smoothed into a DC voltage by the capacitor C1. That is, the first rectification and smoothing circuit RT01 rectifies an AC voltage supplied from the power receiving coil L2 and converts the AC voltage into a DC voltage. In the example illustrated in FIG. 2, the first rectification and smoothing circuit RT01 is connected to the load Vload. When the first rectification and smoothing circuit RT01 is connected to the load Vload, the first rectification and smoothing circuit RT01 supplies the converted DC voltage to the load Vload.

Here, when power which is transmitted from the power transmitting coil unit 13 to the power receiving coil unit 21 is normal power, the first rectification and smoothing circuit RT01 converts an AC voltage supplied from the power receiving coil L2 into a DC voltage and supplies the converted DC voltage to the load Vload. On the other hand, when power which is transmitted from the power transmitting coil unit 13 to the power receiving coil unit 21 is weak power, the first rectification and smoothing circuit RT01 does not supply a weak voltage supplied from the power receiving coil L2 to the load Vload when a peak value of the weak voltage is lower than the potential of a junction point P21. Here, the junction point P21 is a junction point between the transmission line connecting the output terminal RT1P of the first rectifier circuit RT1 and the power supply terminal VP of the load Vload and the terminal C2A of the capacitor C2.

The first voltage detecting circuit VD1 detects a DC voltage which is applied between the output terminal RT1P and the output terminal RT1N of the first rectifier circuit RT1. The first voltage detecting circuit VD1 outputs the detected DC voltage to the abnormality detecting circuit ED. Here, when power which is transmitted from the power transmitting coil unit 13 to the power receiving coil unit 21 is weak power, the first voltage detecting circuit VD1 detects the voltage of the load Vload because the supply of the weak voltage from the power receiving coil L2 to the load Vload is not performed by the first rectification and smoothing circuit RT01.

The second rectifier circuit RT2 rectifies an AC voltage supplied from the power receiving coil L2 and converts the voltage into a pulsating voltage. For example, the second rectifier circuit RT2 may be a half-wave rectifier circuit including one switching element, a half-wave rectifier circuit including one diode, a full-wave rectifier circuit including four switching elements or four diodes which are bridge-connected, or another rectifier circuit that rectifies an AC voltage supplied from the power receiving coil L2 and converts the voltage into a pulsating voltage. The pulsating voltage rectified by the second rectifier circuit RT2 is smoothed into a DC voltage by the capacitor C2. That is, the second rectification and smoothing circuit RT02 rectifies an AC voltage supplied from the power receiving coil L2 and converts the AC voltage into a DC voltage. In the example illustrated in FIG. 2, the second rectification and smoothing circuit RT02 is connected to the second voltage detecting circuit VD2. Therefore, the second rectification and smoothing circuit RT02 supplies the converted DC voltage to the second voltage detecting circuit VD2.

The second voltage detecting circuit VD2 detects a DC voltage which is applied between the output terminal RT2P and the output terminal RT2N of the second rectifier circuit RT2. The second voltage detecting circuit VD2 outputs the detected DC voltage to the abnormality detecting circuit ED and outputs the detected DC voltage to the position detecting circuit PD.

When power which is transmitted from the power transmitting coil L1 to the power receiving coil L2 is weak power, the position detecting circuit PD detects the position of the power receiving coil L2 relative to a power transmitting coil L1 on the basis of the DC voltage detected by the second voltage detecting circuit VD2. Here, when power which is transmitted from the power transmitting coil L1 to the power receiving coil L2 is weak power, a magnitude of the DC voltage changes according to a magnitude of a peak value of the weak voltage supplied from the power receiving coil L2 (for example, is proportional to the magnitude), and becomes a maximum when the position of the power receiving coil L2 relative to the power transmitting coil L1 has matched the predetermined position. By using a relationship between the peak value and the position of the power receiving coil L2 relative to the power transmitting coil L1, the position detecting circuit PD can detect the position of the power receiving coil L2 relative to the power transmitting coil L1 on the basis of the DC voltage output from the second voltage detecting circuit VD2. In a case in which power which is transmitted from the power transmitting coil L1 to the power receiving coil L2 is weak power, the abnormality detecting circuit ED outputs position information indicating the detected position to the main control circuit 23A when the abnormality detecting circuit ED has detected the position of the power receiving coil L2 relative to the power transmitting coil L1.

Here, in a case in which power consumption of the load Vload is high as in a battery mounted in the electric vehicle EV, when power which is transmitted from the wireless power transmission device 10 to the wireless power reception device 20 is a normal power, in the wireless power reception device 20, it is necessary to increase capacitance of the capacitor C1 as ripples of the voltage supplied from the first rectifier circuit RT1 to the load Vload is to be reduced. However, when the capacitance of the capacitor C1 is increased, output impedance viewed from the first voltage detecting circuit VD1 is decreased from a relationship of $1/(\omega C)$ in which the capacitance of the capacitor C1 is C and a frequency of a voltage applied to the capacitor C1 is $\omega$ in the wireless power reception device 20. Here, when power which is transmitted from the power transmitting coil L1 to the power receiving coil L2 is weak power, a voltage Vo detected by the first voltage detecting circuit VD1 is expressed by $Vo=\omega_k\sqrt{(L_{L1}L_{L2})}i_{L1}$ in which self inductance of the power transmitting coil L1 is $L_{L1}$, self inductance of the power receiving coil L2 is $L_{L2}$, a coupling coefficient according to the relative position of the power receiving coil L2 with respect to the power transmitting coil L1 is k, a frequency according to the coupling coefficient k as a frequency of a voltage applied to the capacitor C1 is $\omega_k$, a current of the power transmitting coil L1 is $i_{L1}$, and output impedance viewed from the first voltage detecting circuit VD1 is ∞. However, the voltage detected by the first voltage detecting circuit VD1 may be reduced because the voltage Vo cannot be expressed by $Vo=\omega_k\sqrt{(L_{L1}L_{L2})}i_{L1}$ due to a decrease in the output impedance viewed from the first voltage detecting circuit VD1 according to an increase in the capacitance C of the capacitor C1. Therefore, when the wireless power reception device 20 attempts to detect the position of the power receiving coil L2 relative to the power transmitting coil L1 on the basis of the DC voltage, it may be difficult for the wireless power reception device 20 to accurately detect the position of the power receiving coil L2 relative to the power transmitting coil L1. However, in the wireless power reception device 20, when power which is transmitted from the power transmitting coil L1 to the power receiving coil L2 is weak power, the position detecting circuit PD detects the position of the power receiving coil L2 relative to the power transmitting coil L1 on the basis of the DC voltage detected by the second voltage detecting circuit VD2, as described above. Therefore, the wireless power reception device 20 in this example can increase a gain of the output voltage of the second voltage detecting circuit VD2 while suppressing the ripples output from the first rectifier circuit RT1 by setting the capacitance of the capacitor C2 to be smaller than the capacitance of the capacitor C1.

When power which is transmitted from the power transmitting coil L1 to the power receiving coil L2 is weak power, the abnormality detecting circuit ED detects whether a failure has occurred in the wireless power reception device 20 on the basis of at least one of a DC voltage detected by the first voltage detecting circuit VD1 and a DC voltage detected by the second voltage detecting circuit VD2.

More specifically, when power which is transmitted from the power transmitting coil unit 13 to the power receiving coil unit 21 is weak power, the abnormality detecting circuit ED detects, for example, whether a failure has occurred in the rectifier circuit RT1 on the basis of the DC voltage detected by the second voltage detecting circuit VD2. The failure of the first rectifier circuit RT1 detected by the abnormality detecting circuit ED is, for example, a short-circuit failure in which the terminal L2A of the power receiving coil L2 and the terminal L2B of the power receiving coil L2 are short-circuited. When power which is transmitted from the power transmitting coil L1 to the power receiving coil L2 is weak power and the short-circuit failure has occurred as a failure of the first rectifier circuit RT1 detected by the abnormality detecting circuit ED, a DC voltage that is detected by the second voltage detecting circuit VD2 becomes the voltage of the load Vload. On the other hand, when power which is transmitted from the power transmitting coil L1 to the power receiving coil L2 is weak power and the first rectifier circuit RT1 operates normally, the DC voltage that is detected by the second voltage detecting circuit VD2 becomes the DC voltage after a weak voltage generated in the power receiving coil L2 is rectified by the first rectification and smoothing circuit RT01. Accordingly, when power which is transmitted from the power transmitting coil L1 to the power receiving coil L2 is weak power, the abnormality detecting circuit ED can detect whether a failure has occurred in the first rectifier circuit RT1 on the basis of the DC voltage detected by the second voltage detecting circuit VD2. Here, the abnormality detecting circuit ED, for example, acquires the voltage of the load Vload from another detection circuit that detects the voltage of the load Vload or an electronic control unit (ECU) included in the electric vehicle EV in which the wireless power reception device 20 is mounted, and compares the acquired voltage with the DC voltage detected by the second voltage detecting circuit VD2 to determine whether the DC voltage is the voltage has become the load Vload. In a case in which power which is transmitted from the power transmitting coil L1 to the power receiving coil L2 is weak power, the abnormality detecting circuit ED outputs first failure information indicating that the failure has occurred in the first rectifier circuit RT1 to the main control circuit 23A when the abnormality detecting circuit ED detects that a failure has occurred in the first rectifier circuit RT1. The abnormality detecting circuit ED may be configured to acquire the voltage of the load Vload using another method.

When power which is transmitted from the power transmitting coil L1 to the power receiving coil L2 is weak power, the abnormality detecting circuit ED detects, for example, whether a failure has occurred in the second voltage detecting circuit VD2 on the basis of the DC voltage detected by the second voltage detecting circuit VD2. The failure of the second voltage detecting circuit VD2 detected by the abnormality detecting circuit ED is, for example, breakage of a resistor of a voltage division circuit included in the second voltage detecting circuit VD2, and a failure in which an abnormal value according to breakage of a buffer included at a stage after the voltage division circuit is displayed as a detected voltage. In a case in which power which is transmitted from the power transmitting coil L1 to the power receiving coil L2 is weak power, a DC voltage detected by the second voltage detecting circuit VD2 becomes an abnormal value when a failure, which is detected by the abnormality detecting circuit ED, occurs in the second voltage detecting circuit VD2. On the other hand, in a case in which power which is transmitted from the power transmitting coil L1 to the power receiving coil L2 is weak power, the DC voltage detected by the second voltage detecting circuit VD2 becomes a DC voltage after a weak voltage generated in the power receiving coil L2 has been rectified in the second rectification and smoothing circuit RT02, when the second voltage detecting circuit VD2 operates normally. Accordingly, when power which is transmitted from the power transmitting coil L1 to the power receiving coil L2 is weak power, the abnormality detecting circuit ED can detect whether a failure has occurred in the second voltage detecting circuit VD2 on the basis of the DC voltage detected by the second voltage detecting circuit VD2. Here, for example, when the DC voltage detected by the second voltage detecting circuit VD2 does not change around 0 V or when the DC voltage detected by the second voltage detecting circuit VD2 is saturated at a power supply voltage of the second voltage detecting circuit VD2, the abnormality detecting circuit ED determines that the DC voltage detected by the second voltage detecting circuit VD2 is an abnormal value. When the abnormality detecting circuit ED determines that the DC voltage is an abnormal value, the abnormality detecting circuit ED detects that a failure has occurred in the second voltage detecting circuit VD2. When the abnormality detecting circuit ED detects that a failure has occurred in the second voltage detecting circuit VD2 in a case in which power which is transmitted from the power transmitting coil L1 to the power receiving coil L2 is weak power, the abnormality detecting circuit ED outputs second failure information indicating that a failure has occurred in the second voltage detecting circuit VD2 to the main control circuit 23A. The abnormality detecting circuit ED may be configured to determine whether or not the DC voltage detected by the second voltage detecting circuit VD2 is an abnormal value using another method.

Further, when power which is transmitted from the power transmitting coil L1 to the power receiving coil L2 is weak power, the abnormality detecting circuit ED detects, for example, whether a failure has occurred in the first voltage detecting circuit VD1 on the basis of the DC voltage detected by the first voltage detecting circuit VD1. The failure of the first voltage detecting circuit VD1 detected by the abnormality detecting circuit ED is, for example, breakage of a resistor of a voltage division circuit included in the first voltage detecting circuit VD1, and a failure in which an abnormal value according to breakage of a buffer included at a stage after the voltage division circuit is displayed as a detected voltage. In a case in which power which is transmitted from the power transmitting coil L1 to the power receiving coil L2 is weak power, a DC voltage detected by the first voltage detecting circuit VD1 becomes an abnormal value when a failure, which is detected by the abnormality detecting circuit ED, occurs in the first voltage detecting circuit VD1. On the other hand, in a case in which power which is transmitted from the power transmitting coil L1 to the power receiving coil L2 is weak power, the DC voltage detected by the first voltage detecting circuit VD1 becomes a voltage of the load Vload when the first voltage detecting circuit VD1 operates normally. Accordingly, when power which is transmitted from the power transmitting coil L1 to the power receiving coil L2 is weak power, the abnormality detecting circuit ED can detect whether a failure has occurred in the first voltage detecting circuit VD1 on the basis of the DC voltage detected by the first voltage detecting circuit VD1. Here, the abnormality detecting circuit ED, for example, acquires the voltage of the load Vload from another detection circuit that detects the voltage of the load Vload or the ECU included in the electric vehicle EV in which the wireless power reception device 20 has been mounted, compares the acquired voltage with the DC voltage detected by the first voltage detecting circuit VD1, and determines that the DC voltage has become an abnormal value when the DC voltage does not match the voltage of the load Vload (for example, when the DC voltage is not included in an error range according to the voltage of the load Vload). When the abnormality detecting circuit ED determines that the DC voltage is an abnormal value, the abnormality detecting circuit ED detects that a failure has occurred in the first voltage detecting circuit VD1. When the abnormality detecting circuit ED detects that a failure has occurred in the first voltage detecting circuit VD1 in a case in which power which is transmitted from the power transmitting coil L1 to the power receiving coil L2 is weak power, the abnormality detecting circuit ED outputs third failure information indicating that a failure has occurred in the first voltage detecting circuit VD1 to the main control circuit 23A. The abnormality detecting circuit ED may be configured to acquire the voltage of the load Vload using another method. Further, when the DC voltage detected by the first voltage detecting circuit VD1 does not change around 0 V or when the DC voltage detected by the first voltage detecting circuit VD1 is saturated at a power supply voltage of the first voltage detecting circuit VD1, the abnormality detecting circuit ED determines that the DC voltage detected by the first voltage detecting circuit VD1 is an abnormal value.

The main control circuit 23A performs transmission and reception of various types of information to and from the wireless power transmission device 10.

In a case in which power which is transmitted from the power transmitting coil L1 to the power receiving coil L2 is weak power, the main control circuit 23A determines whether the position indicated by acquired position information matches a predetermined position when the main control circuit 23A acquires the position information from the position detecting circuit PD. When the main control circuit 23A determines that the position indicated by the acquired position information matches a predetermined position, the main control circuit 23A outputs, for example, information indicating that the position of the power receiving coil L2 relative to the power transmitting coil L1 has matched the predetermined position to the wireless power transmission device 10 through wireless communication.

Further, in a case in which power which is transmitted from the power transmitting coil L1 to the power receiving coil L2 is weak power, the main control circuit 23A outputs, for example, the first failure information to another device through wireless communication when the main control circuit 23A acquires the first failure information from the abnormality detecting circuit ED. Accordingly, the wireless power reception device 20 can inform (notify) that the first rectifier circuit RT1 has failed, and prompt replacement of the first rectifier circuit RT1. The other device may be the wireless power transmission device 10 or another information processing device. Further, when power which is transmitted from the power transmitting coil L1 to the power receiving coil L2 is weak power, the main control circuit 23A may be configured to inform (notify) a user that a failure has occurred in the first rectifier circuit RT1 by, for example, displaying an alarm image, sounding a warning (for example, an alarm), or vibrating a vibrator when the main control circuit 23A acquires the first failure information from the abnormality detecting circuit ED.

Further, in a case in which power which is transmitted from the power transmitting coil L1 to the power receiving coil L2 is weak power, the main control circuit 23A outputs, for example, the second failure information to another device through wireless communication when the main control circuit 23A acquires the second failure information from the abnormality detecting circuit ED. Accordingly, the wireless power reception device 20 can inform that the first voltage detecting circuit VD1 has failed, and prompt replacement of the first voltage detecting circuit VD1. The other device may be the wireless power transmission device 10 or another information processing device. Further, when power which is transmitted from the power transmitting coil L1 to the power receiving coil L2 is weak power, the main control circuit 23A may be configured to inform (notify) a user that a failure has occurred in the first voltage detecting circuit VD1 by, for example, displaying an alarm image, sounding a warning (for example, an alarm), or vibrating a vibrator when the main control circuit 23A acquires the second failure information from the abnormality detecting circuit ED.

Further, in a case in which power which is transmitted from the power transmitting coil L1 to the power receiving coil L2 is weak power, the main control circuit 23A outputs, for example, the third failure information to another device through wireless communication when the main control circuit 23A acquires the third failure information from the abnormality detecting circuit ED. Accordingly, the wireless power reception device 20 can inform that the second voltage detecting circuit VD2 has failed, and prompt replacement of the second voltage detecting circuit VD2. The other device may be the wireless power transmission device 10 or another information processing device. Further, when power which is transmitted from the power transmitting coil L1 to the power receiving coil L2 is weak power, the main control circuit 23A may be configured to inform (notify) a user that a failure has occurred in the second voltage detecting circuit VD2 by, for example, displaying an alarm image, sounding a warning (for example, an alarm), or vibrating a vibrator when the main control circuit 23A acquires the third failure information from the abnormality detecting circuit ED.

The position detecting circuit PD described above may be configured integrally with the main control circuit 23A.

Further, the abnormality detecting circuit ED described above may be configured integrally with the main control circuit 23A.

As described above, a wireless power reception device according to the embodiment (the wireless power reception device 20 in this example) receives an AC power from a power transmitting coil (the power transmitting coil L1 in this example) of a wireless power transmission device (the wireless power transmission device 10 in this example). The wireless power reception device includes: a power receiving coil (the power receiving coil L2 in this example) that is magnetically coupled to the power transmitting coil; a first rectifier circuit (the first rectifier circuit RT1 in this example) that rectifies an AC voltage supplied from the power receiving coil and outputs the rectified voltage to a load (the load Vload in this example); a first capacitor (the capacitor C1 in this example) connected between an 11th output terminal on the high potential side (the output terminal RT1O1 in this example) among output terminals included in the first rectifier circuit and a 12th output terminal on the low potential side (the output terminal RT1O2 in this example) among the output terminals included in the first rectifier circuit between the first rectifier circuit and the load; a second rectifier circuit (the second rectifier circuit RT2 in this example) that is connected to the power receiving coil in parallel to the first rectifier circuit and rectifies the AC voltage supplied from the power receiving coil; a second capacitor (the capacitor C2 in this example) connected between a 21st output terminal on the high potential side (the output terminal RT2O1 in this example) among output terminals included in the second rectifier circuit and a 22nd output terminal on the low potential side (the output terminal RT2O2 in this example) among the output terminals included in the second rectifier circuit; a second voltage detecting circuit (the second voltage detecting circuit VD2 in this example) that detects a voltage between the 21st output terminal and the 22nd output terminal; and a position detecting circuit (the position detecting circuit PD in this example) that detects a position of the power receiving coil relative to the power transmitting coil on the basis of the voltage detected by the second voltage detecting circuit. Accordingly, the wireless power reception device 20 can accurately detect a position of a power receiving coil relative to a power transmitting coil irrespective of a connection state of a load.

In the wireless power reception device, a capacitance of the second capacitor is smaller than the capacitance of the first capacitor. Accordingly, the wireless power reception device can increase the gain of the output voltage of the second voltage detecting circuit while suppressing ripples output from the first rectifier circuit. As a result, the wireless power reception device can detect the position of a power receiving coil relative to a power transmitting coil irrespective of a connection state of a load.

The wireless power reception device further includes: a first voltage detecting circuit (the first voltage detecting circuit VD1 in this example) that detects a voltage between the 11th output terminal and the 12th output terminal; and an abnormality detecting circuit (the abnormality detecting circuit ED in this example) that detects whether a failure has occurred in the wireless power reception device on the basis of at least one of the voltage detected by the first voltage detecting circuit and the voltage detected by the second voltage detecting circuit when power which is transmitted from the power transmitting coil to the power receiving coil is weak power. Accordingly, the wireless power reception device can inform that a failure has occurred in the wireless power reception device.

In the wireless power reception device, when power which is transmitted from the power transmitting coil to the power receiving coil is weak power, the abnormality detecting circuit detects whether a failure has occurred in the first rectifier circuit on the basis of the voltage detected by the second voltage detecting circuit. Accordingly, the wireless power reception device can inform that the first rectifier circuit has failed and can prompt replacement of the first rectifier circuit.

In the wireless power reception device, when power which is transmitted from the power transmitting coil to the power receiving coil, the abnormality detecting circuit detects whether a failure has occurred in the first voltage detecting circuit on the basis of the voltage detected by the first voltage detecting circuit. Accordingly, the wireless power reception device can inform that the first voltage detecting circuit has failed and can prompt replacement of the first voltage detecting circuit.

In the wireless power reception device, when power which is transmitted from the power transmitting coil to the power receiving coil, the abnormality detecting circuit detects whether a failure has occurred in the second voltage detecting circuit on the basis of the voltage detected by the second voltage detecting circuit. Accordingly, the wireless power reception device can inform that the second voltage detecting circuit has failed and can prompt replacement of the second voltage detecting circuit.

While an embodiment of the invention has been described above in detail with reference to the drawings, the specific elements of the invention is not limited to the embodiment and may be changed, replaced, deleted, or the like without departing from the gist of the invention.

EXPLANATION OF REFERENCES

1 Wireless power transmission system
10 Wireless power transmission device
11 Conversion circuit
12 Power transmitting circuit
13 Power transmitting coil unit
20 Wireless power reception device
21 Power receiving coil unit
22A First circuit
22B Second circuit
23 Control circuit
23A Main control circuit
C1, C2 Capacitor
ED Abnormality detecting circuit
EV Electric vehicle
G Ground
L1 Power transmitting coil
L2 Power receiving coil
LN1, LN2 Transmission line
P Commercial power supply
P1, P2, P21 Connection point
PD Position detecting circuit
RT01 First rectification and smoothing circuit
RT1 First rectifier circuit
RT02 Second rectification and smoothing circuit
RT2 Second rectifier circuit
VD1 First voltage detecting circuit
VD2 Second voltage detecting circuit
Vload Load

What is claimed is:

1. A wireless power reception device that receives AC power from a power transmitting coil of a wireless power transmission device, the wireless power reception device comprising:
   a power receiving coil configured to magnetically couple to the power transmitting coil;
   a first rectifier circuit that rectifies an AC voltage supplied from the power receiving coil and outputs the rectified voltage to a load;
   a first capacitor connected on its high potential side to an 11th output terminal among output terminals included in the first rectifier circuit and on its low potential side to a 12th output terminal among the output terminals included in the first rectifier circuit, the first capacitor being provided between the first rectifier circuit and the load;
   a second rectifier circuit that is connected to the power receiving coil in parallel to the first rectifier circuit and rectifies the AC voltage supplied from the power receiving coil;
   a second capacitor connected on its high potential side to a 21st output terminal among output terminals included in the second rectifier circuit and on its low potential side to a 22nd output terminal among the output terminals included in the second rectifier circuit;
   a second voltage detecting circuit that detects a voltage between the 21st output terminal and the 22nd output terminal; and
   a position detecting circuit that detects a position of the power receiving coil relative to the power transmitting coil based on the voltage detected by the second voltage detecting circuit.

2. The wireless power reception device according to claim 1, wherein a capacitance of the second capacitor is smaller than a capacitance of the first capacitor.

3. The wireless power reception device according to claim 2, comprising:
   a first voltage detecting circuit that detects a voltage between the 11th output terminal and the 12th output terminal; and
   an abnormality detecting circuit that detects whether a failure has occurred in the wireless power reception device based on at least one of the voltage detected by the first voltage detecting circuit and the voltage detected by the second voltage detecting circuit when power which is transmitted from the power transmitting coil to the power receiving coil is weak power.

4. The wireless power reception device according to claim 3, wherein when power which is transmitted from the power transmitting coil to the power receiving coil is the weak power, the abnormality detecting circuit detects whether the failure has occurred in the first rectifier circuit based on the voltage detected by the second voltage detecting circuit.

5. The wireless power reception device according to claim 4, wherein when power which is transmitted from the power transmitting coil to the power receiving coil is the weak power, the abnormality detecting circuit detects whether the failure has occurred in the first voltage detecting circuit based on the voltage detected by the first voltage detecting circuit.

6. The wireless power reception device according to claim 4, wherein when power which is transmitted from the power transmitting coil to the power receiving coil is the weak power, the abnormality detecting circuit detects whether the failure has occurred in the second voltage detecting circuit based on the voltage detected by the second voltage detecting circuit.

7. The wireless power reception device according to claim 3, wherein when power which is transmitted from the power transmitting coil to the power receiving coil is the weak power, the abnormality detecting circuit detects whether the failure has occurred in the first voltage detecting circuit based on the voltage detected by the first voltage detecting circuit.

8. The wireless power reception device according to claim 7, wherein when power which is transmitted from the power transmitting coil to the power receiving coil is the weak power, the abnormality detecting circuit detects whether the failure has occurred in the second voltage detecting circuit based on the voltage detected by the second voltage detecting circuit.

9. The wireless power reception device according to claim 3, wherein when power which is transmitted from the power transmitting coil to the power receiving coil is the weak power, the abnormality detecting circuit detects whether the failure has occurred in the second voltage detecting circuit based on the voltage detected by the second voltage detecting circuit.

10. A wireless power transmission system comprising:
the wireless power transmission device, and
the wireless power reception device according to claim 3.

11. A wireless power transmission system comprising:
the wireless power transmission device, and
the wireless power reception device according to claim 2.

12. The wireless power reception device according to claim 1, comprising:
a first voltage detecting circuit that detects a voltage between the 11 th output terminal and the 12th output terminal; and
an abnormality detecting circuit that detects whether a failure has occurred in the wireless power reception device based on at least one of the voltage detected by the first voltage detecting circuit and the voltage detected by the second voltage detecting circuit when power which is transmitted from the power transmitting coil to the power receiving coil is weak power.

13. The wireless power reception device according to claim 12, wherein when power which is transmitted from the power transmitting coil to the power receiving coil is the weak power, the abnormality detecting circuit detects whether the failure has occurred in the first rectifier circuit based on the voltage detected by the second voltage detecting circuit.

14. The wireless power reception device according to claim 13, wherein when power which is transmitted from the power transmitting coil to the power receiving coil is the weak power, the abnormality detecting circuit detects whether the failure has occurred in the first voltage detecting circuit based on the voltage detected by the first voltage detecting circuit.

15. The wireless power reception device according to claim 13, wherein when power which is transmitted from the power transmitting coil to the power receiving coil is the weak power, the abnormality detecting circuit detects whether the failure has occurred in the second voltage detecting circuit based on the voltage detected by the second voltage detecting circuit.

16. The wireless power reception device according to claim 12, wherein when power which is transmitted from the power transmitting coil to the power receiving coil is the weak power, the abnormality detecting circuit detects whether the failure has occurred in the first voltage detecting circuit based on the voltage detected by the first voltage detecting circuit.

17. The wireless power reception device according to claim 16, wherein when power which is transmitted from the power transmitting coil to the power receiving coil is the weak power, the abnormality detecting circuit detects whether the failure has occurred in the second voltage detecting circuit based on the voltage detected by the second voltage detecting circuit.

18. The wireless power reception device according to claim 12, wherein when power which is transmitted from the power transmitting coil to the power receiving coil is the weak power, the abnormality detecting circuit detects whether the failure has occurred in the second voltage detecting circuit based on the voltage detected by the second voltage detecting circuit.

19. A wireless power transmission system comprising:
the wireless power transmission device, and
the wireless power reception device according to claim 12.

20. A wireless power transmission system comprising:
the wireless power transmission device, and
the wireless power reception device according to claim 1.

* * * * *